US010434827B2

United States Patent
Tomakidi (10) Patent No.: US 10,434,827 B2
(45) Date of Patent: Oct. 8, 2019

(54) METHOD FOR CONFIGURING A TYRE PRESSURE SENSOR

(71) Applicant: Huf Baolong Electronics Bretten GmbH, Bretten (DE)

(72) Inventor: Thomas Tomakidi, Velbert (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 62 days.

(21) Appl. No.: 15/110,179

(22) PCT Filed: Jan. 19, 2015

(86) PCT No.: PCT/EP2015/050911
§ 371 (c)(1),
(2) Date: Jul. 7, 2016

(87) PCT Pub. No.: WO2015/107203
PCT Pub. Date: Jul. 23, 2015

(65) Prior Publication Data
US 2016/0325592 A1 Nov. 10, 2016

(30) Foreign Application Priority Data

Jan. 17, 2014 (DE) .......................... 10 2014 100 533
Jul. 25, 2014 (DE) .......................... 10 2014 110 566

(51) Int. Cl.
*B60C 23/04* (2006.01)
*G01M 17/02* (2006.01)
(Continued)

(52) U.S. Cl.
CPC ...... *B60C 23/0479* (2013.01); *B60C 23/0471* (2013.01); *G01M 17/013* (2013.01);
(Continued)

(58) Field of Classification Search
CPC ............ B60C 23/0408; B60C 23/0433; B60C 23/0455; B60C 23/0462; B60C 23/0464;
(Continued)

(56) References Cited

U.S. PATENT DOCUMENTS 6,825,758 B1 * 11/2004 Laitsaari ............. B60C 23/0433
116/34 R
7,518,495 B2 * 4/2009 Tang ................... B60C 23/0408
340/442
(Continued)

FOREIGN PATENT DOCUMENTS

EP 1172237 A2 1/2002
GB 2500697 A 10/2013
(Continued)

OTHER PUBLICATIONS

International Search Report dated Mar. 20, 2015 in corresponding Application No. PCT/EP2015/050911; 2 pgs.
(Continued)

*Primary Examiner* — Randy W Gibson
*Assistant Examiner* — Gedeon M Kidanu
(74) *Attorney, Agent, or Firm* — Maier & Maier, PLLC (57) ABSTRACT

A method for the configuration of a tire pressure sensor for a vehicle, including the following steps: production of a data communication connection between a mobile radio device and a tire pressure sensor, selection of at least one specific sensor parameter for the vehicle via a mobile radio device, and activation of the at least one selected sensor parameter and the tire pressure sensor.

21 Claims, 5 Drawing Sheets

(51) Int. Cl.
*G06F 8/10* (2018.01)
*G01M 17/013* (2006.01)
*G06F 8/65* (2018.01)

(52) U.S. Cl.
CPC ............... *G01M 17/02* (2013.01); *G06F 8/10* (2013.01); *G06F 8/65* (2013.01)

(58) Field of Classification Search
CPC ............ B60C 23/0471; B60C 23/0479; B60C 23/044; B60C 23/0444; B60C 23/0474; B60C 23/0481; B60R 2325/205; G01K 13/08; G01K 1/024; G01K 3/005; G01M 17/00; G01M 17/02; G07C 5/0808; G07C 9/00309; G07C 5/008
See application file for complete search history.

(56) References Cited

U.S. PATENT DOCUMENTS

| | | | | |
|---|---|---|---|---|
| 7,518,497 | B2* | 4/2009 | Jost | B60C 23/0416 340/426.33 |
| 7,688,192 | B2* | 3/2010 | Kenny | B60C 23/0408 340/447 |
| 8,502,655 | B2* | 8/2013 | Deniau | B60C 23/0462 340/442 |
| 2004/0203370 | A1* | 10/2004 | Luo | H04W 4/18 455/41.2 |
| 2012/0139751 | A1* | 6/2012 | Lin | B60C 23/0479 340/870.07 |
| 2012/0176233 | A1* | 7/2012 | Petrucelli | B60C 23/0401 340/447 |
| 2012/0244877 | A1* | 9/2012 | Margalef | G01S 5/0252 455/456.1 |
| 2013/0226403 | A1* | 8/2013 | Zhang | G01M 17/02 701/36 |
| 2014/0011455 | A1* | 1/2014 | Hsu | B60C 23/0479 455/41.3 |
| 2014/0165026 | A1* | 6/2014 | McIntyre | B60C 23/0471 717/100 |
| 2014/0256304 | A1* | 9/2014 | Frye | H04W 4/046 455/418 |
| 2015/0015387 | A1* | 1/2015 | McIntyre | B60C 23/0471 340/447 |

FOREIGN PATENT DOCUMENTS

| | | |
|---|---|---|
| JP | 2003-178219 A | 6/2003 |
| JP | 2005-219548 A | 8/2005 |
| JP | 2006-232031 A | 9/2006 |
| WO | 2013/152294 A1 | 10/2013 |

OTHER PUBLICATIONS

International Preliminary Report on Patentability dated Apr. 1, 2016 in corresponding Application No. PCT/EP2015/050911; 13 pgs.
Chinese Office Action dated Jun. 16, 2017, in connection with corresponding CN Application No. 201580003976.7 (12 pgs., including English abstract).

* cited by examiner

METHOD FOR CONFIGURING A TYRE PRESSURE SENSOR

The present invention relates to a method for configuring a tyre pressure sensor and a computer program product for performing such a method on a mobile radio device.

Such methods are basically known in which tyre pressure sensors are configured to a vehicle. Tyre pressure sensors exist in order to determine the internal pressure in a wheel within a tyre. This tyre pressure can be subsequently transferred to the control device of the vehicle via a wireless interface. Therewith a safety advantage is achieved since the vehicle and therewith also the driver of the vehicle permanently possesses information about the tyre pressure in the respective wheel. Therewith a slow or subtle loss of tyre pressure can be determined in time and therewith information to the driver of the vehicle can be provided.

It is a disadvantage with these known solutions that the adjustment of the tyre pressure sensors to the respective vehicle involves great effort. Thus particularly the communication in form of a communication protocol between the respective tyre pressure sensor and the control device of the respective vehicle is dependent on the vehicle type or the vehicle manufacturer. Besides other parameters, for example, measuring area trigger limits or the actual signal format of the tyre pressure sensor, is vehicle-specific or vehicle type-specific. Accordingly, until now two different types of tyre pressure sensors are provided. These are, on the one hand, vehicle-specific tyre pressure sensors which are configured to the respective vehicle by the manufacturer. This means for workshops, that such specific tyre pressure sensors have to be stored for all types of vehicles in the workshop. Therewith a high warehousing effort with the corresponding space requirements, the corresponding logistics and the corresponding costs occurs. At the same time, so-called universal sensors are offered as tyre pressure sensors. These can be basically used in each vehicle or vehicle type, but have to be configured to the respective vehicle concerning the sensor parameters. The configuration thereby relates to the corresponding adjustment of the corresponding sensor parameter to the vehicle or vehicle type.

This occurs with a high effort during mounting of the tyres on the wheel rim, meaning, by separate programming devices which are again specific for the respective universal sensor type. In other words, this means that although a workshop can store up a defined amount of universal tyre pressure sensors, it has to possess the programming devices provided by the respective manufacturer for the different universal tyre pressure sensors. Beneath the high cost effort and the warehousing, this leads to a high complexity for the tyre dealer or the workshop. At the same time, a high complexity for the technician of the tyres occurs by the variation of different programming devices.

It is object of the present invention to at least partially avoid said disadvantages. Particularly, it is the object of the present invention to improve the configuration of a tyre pressure sensor on a vehicle in a cost-efficient and simple manner preferably to reduce the necessary time for the configuration.

Said object is solved by a method with the features of claim 1 and a computer programme product with the features of claim 11. Further features and details of the invention result from the depending claims, the description and the drawings, thereby features and details which are described in connection with the method according to the invention apply naturally also in connection with the computer programme product according to the invention and vice versa, so that according to the disclosure of the single embodiments it can be reciprocally related to.

With a method according to the invention for the configuration of a tyre pressure sensor on a vehicle, the following steps are performed:

production of a data communication connection between a mobile radio device and a tyre pressure sensor, selection of at least one sensor parameter specific for the vehicle using the mobile radio device, activation of the at least one selected sensor parameter in the tyre pressure sensor.

A method according to the invention basically serves for known configurations of the tyre pressure sensor on the vehicle. Thereby, this configuration relates to at least one sensor parameter specific for the respective vehicle. Such a sensor parameter can be, as already described, a corresponding communication format for the related specific control device of the vehicle. Besides, other sensor parameters can alternatively or additionally be used for the configuration. For example, it can be about measuring areas of the tyre pressure sensors or corresponding trigger limits. Besides, the format of the transmitted signal can be adjustable in a vehicle-specific manner by a configuration with the method according to the invention.

A crucial step for the present invention is that with the method a data communication connection between the tyre pressure sensor and a mobile radio device is established. Within the scope of the present invention a mobile radio device represents a device, which is actually no specific programming device for the tyre pressure sensor. Moreover, a mobile radio device is each device which serves as a primary function for the mobile radio or a similar utilisation. Particularly, a mobile radio device means a cell phone or a so-called tablet PC. Thus, a primary function of a mobile radio device is particularly a further utilisation, particularly a private or a commercial use of the device by the appropriate user. In other words, a method according to the invention by a data communication between a tyre pressure sensor and a mobile radio device is provided as a secondary or a further subordinated function of the mobile radio device.

By the use of a mobile radio device and its subordinated function, according to the invention the utilisation of specific programming devices is circumvented or can be avoided. Initially, this leads to a great cost advantage and a great complexity advantage. Thus, the complete configuration functionality can be provided by the configuration of a method according to the invention on a mobile radio device, for example as a software product, computer programme product, or a so-called installable app. Therewith, the costs and the complexity of separate and specific programming devices can be avoided.

A further advantage is achieved by the mobile radio device in that normally the users of such mobile radio devices possess a safe handling quality by an intensive use of the primary function. Thus, the method according to the invention is being performed on the basis of this safe handling quality, which in turn supports a safety in handling the configuration and especially the speed of the configuration. As usually tyre pressure sensors must be configured at high speed in order to achieve an appropriate high flow-rate in the workshop minor speed improvements within minutes are of crucial and economic importance.

By a selection of the specific sensor parameter is thereby meant, according to the invention, a correlation of the sensor parameter with a typical or a specific vehicle. Thus, for example, an active input or selection from a list with specific correlation from a plurality of possible sensor parameters with a specific vehicle may take place. This selection occurs preferably on a display device of the mobile radio device, for example, a so-called touchscreen.

The activation of the at least one selected sensor parameter in the tyre pressure sensor thereby relates to a configuration result. In other words, the sensor parameter can be assigned to the function of the tyre pressure sensor by activation such that in the use of the tyre pressure sensor, this selected sensor parameter can be used concerning the related functionality. If, for example, a sensor parameter of a vehicle type-specific or vehicle manufacturer-specific transmitter protocol is selected, activation occurs to the effect that the sensor parameter from now on communicates with the control device of the vehicle with this selected communication protocol.

Naturally, the selection and the activation concerning the actual storage location can occur in the mobile radio device and also in the tyre pressure sensor. Besides a communication from these both storage locations are possible within the scope of the present invention. In case the tyre pressure sensor comprises a relatively large storage space, all possible sensor parameters can be saved there. The selection and activation occurs in this manner, so to say, by a display function of the mobile radio device so that, for example, a so-called day can be set on the specific and selected sensor parameter. If, in opposition thereto, at least a part of the possible sensor parameter is saved in the mobile radio device, an activation can additionally comprise transmission of the selected sensor parameters via the data communication connection and the corresponding storage in the accomplishable storage unit in the tyre pressure sensor.

The method, according to the invention, is thereby not limited to the configuration of a single tyre pressure sensor. Rather, also two or more, as is particularly described subsequently, all tyre pressure sensors of a vehicle can commonly pass through this configuration method. By the performance of a single method for the configuration of two or more tyre pressure sensors, accordingly an even greater time advantage is achieved. Thereby, attention has to be paid that the corresponding data communication connection has sufficient range in order to configure all tyre pressure sensors within this range.

A tyre pressure sensor can thereby comprise different configurations for a method according to the invention. For example, a tyre pressure sensor with integrated valve is possible as target of a configuration method according to the invention. Naturally, also separate tyre pressure sensors are possible within the scope of the present invention which are, for example, assembled on the inner side of the wheel rim.

It can be an advantage when with the method, according to the invention, the data communication connection is established as a wireless connection, particularly on the basis of at least the following radio standards:
WLAN
Bluetooth
NFC (near field communication)
The aforesaid enumeration is a non-final list. Particularly, radio standards are used which are basically used by the tyre pressure sensor for its communication with the respective control device of the vehicle. Thereby, a reduction of complexity of the tyre pressure sensors is possible. At the same time, an application on already existing tyre pressure sensors can be performed for the method according to the invention. Thereby, the method is further simplified and especially put the advantages of the invention for a greater amount of possible tyre pressure sensors into operation. According to the range of the wireless connection, particularly with the use of WLAN or Bluetooth, it is possible to avoid a local contact to the tyre and particularly the vicinity to the tyre. Preferably, these greater ranges can lead to the fact that also two or more tyre pressure sensors are configured at a vehicle at the same time and therewith with the parallel performance of a corresponding time gain. If, concerning the range of the data communication connection this is significantly limited, as for example with the NFC radio standard, the safety against an undesired interference in the configuration from the outside is improved. A further advantage of the radio connection is that a complete waver of the restriction can occur by mechanic interferences.

It is likewise advantageous when with the method, according to the invention, the data communication connection is established in a direct manner with the tyre pressure sensor. In other words, a direct communication takes place between the mobile radio device and the corresponding radio interface with the tyre pressure sensor its wireless interface. This enables to configure the vehicle or the corresponding tyre without the existence of an additional intermediate communication aid device. Concerning the place and the time of the performance of the method, according to the invention, a greater freedom exists. Besides an already-mounted tyre at a vehicle, the configuration can be performed without the control device of the vehicle in an activated mode.

Alternatively or additionally it is further possible that with the method, according to the invention, the data communication connection is established in a direct manner via the control device of the vehicle. Therewith, the effort for a communication can be significantly reduced, so particularly it can be referred to the communication connection and the corresponding communication standard between the control device of the vehicle and a tyre pressure sensor. An advantage of this embodiment is that therewith in any case, all already mounted tyres in the vehicle can be configured at the same time and therewith a parallel time gain possibility is achieved. A further advantage is a definite single interface for these parallel configurations for the mobile radio device. Not last in this manner, the interface effort with the respective tyre pressure sensors can be reduced and particularly a method, according to the invention, is usable for already existing tyre pressure sensors. A further advantage of this embodiment is that with the vehicle, the ignition has to be turned on in order to transfer the control device in a corresponding communication mode. This avoids particularly the risk of an abuse with the method, according to the invention. Further, the processing periphery of the control device is usable, wherein the technical effort for the respective tyre pressure sensor or the technical profile of qualification of the mobile radio device is reduced.

It is an advantage when, with the method according to the invention, the selection of the at least one sensor parameter specific for the vehicle occurs from a memory unit of the tyre pressure sensor, particularly from a predefined sensor parameter. A memory unit in a tyre pressure sensor can accordingly save different possible sensor parameters in a universal configuration of a tyre pressure sensor. Besides, a correlation to the corresponding vehicles or vehicle types can be saved. With this embodiment the mobile radio device operates as an extended display wherein the actual reading and writing or activation processes occur within the memory unit of the tyre pressure sensor. This leads to the fact that with greater safety, the tyre pressure sensor has saved the correct sensor parameters ex factory and only with this 100% security a specific sensor parameter is chosen or is selected by the mobile radio device. Besides, a memory of such sensor parameters by a separate app or within the scope of the present method is possible within the scope of the present invention. This possibility involves that the configuration transmission, meaning the necessary duration for a transmission via a data communication connection, a reduction of the data volume and therewith a reduction of the time for transmission becomes possible. Naturally, this embodiment by use of a memory unit can be combined with other memory locations as is described in subsequent paragraphs.

Thus, it is possible that with the method, according to the invention, the selection of at least one sensor parameter, specific for the vehicle occurs from a database in which the respective specific sensor parameter, particularly in correlation to the respective vehicle, is saved. This means that such a database comprises all or a plurality of possible sensor parameters such that the selection of the specific sensor parameter can occur from a plurality in a supporting manner. Besides an assistant function can be configured in the mobile radio device as part of the method, according to the invention, so that a discorrelation by the corresponding correlation information in the database between the specific sensor parameter and the vehicle can be excluded. Naturally also, two or more sensor parameters can be saved in a group as specific sensor parameters in the database, so that the selection of such a sensor parameter group can occur as is subsequently described. Such a database is particularly saved in the mobile radio device. Thereby, a part of the method, according to the invention, can comprise that additionally and previous to the performance of the described steps of the method, a comparison of the database with the database server can be performed. Thus, it can be ensured that the database in the mobile radio device comprises the latest version and it is ensured in this manner that with alteration of the correlation connections in the database after the delivery of the tyre pressure sensor, this the tyre pressure sensor can be configured with the latest specific sensor parameter selection.

A further advantage can be when with the method, according to the invention, the selection of at least two sensor parameters specific for the vehicle occurs commonly via a selection of the vehicle, particularly from a vehicle database. Thereby, it can be understood that in the vehicle database for each vehicle, all configurations, particularly for the complete configuration, necessary sensor parameters in a respective vehicle are saved in a respective vehicle group. In other words, the selection of a sensor parameter group and therewith a vehicle group can occur, so that by a single selection step, all sensor parameters to be configured are selected and subsequently are activatable in one step. This also reduces the necessary time effort and therewith results in significant economic advantages.

It is likewise an advantage when with the method, according to the invention, the method steps of the production of the data communication connection the selection of the at least one sensor parameter and the activation of the at least one selected sensor parameter after mounting of the tyre pressure sensor on a wheel rim occurs. Therewith, a malprogramming of the tyre pressure sensor is avoided with a high capability. Particularly, a configuration can occur when already all tyres on a rim are configured with the corresponding tyre pressure sensors and the tyre rim is mounted at the vehicle. This leads particularly by use of the already described indirect communication via a control device in the vehicle to a significant increase in comfort and safety.

It is further an advantage when with the method, according to the invention, the data communication connection between the mobile radio device and at least two tyre pressure sensors of different tyres of the vehicle, particularly with all tyre pressure sensors of all tyres of the vehicle, is produced for the common configuration of these tyre pressure sensors. Therewith, the already described reduction of the time effort is possible since a parallel configuration of two or more tyre pressure sensors occurs. Therewith, it is further possible that a so-called duplication of a corresponding protocol or a package for a tyre pressure sensor is provided for all tyre pressure sensors such that also the corresponding security is increased. In order to select in parallel the tyre pressure sensors, particularly a coding of the tyre pressure sensors can be performed. Particularly, this selection of the coding is automatized, as is subsequently described. Beneath the possibility that all tyre pressure sensors in its range undergo the configuration process, according to the invention, it is an advantage when a tyre pressure sensor is selected for this method by scanning of a coding, particularly via a scan device of the mobile radio device. In other words, this is a specific and consciously performed, coupling with the production of the data communication connection. Thus, mobile radio devices are often configured for further utilisation functions with camera systems. These normally enable recognition of the barcode in the form of a barcode or a so-called QR code. Naturally, also scan devices in the form of so-called NFC communication or other nearfield communication possibilities are possible by scanning of the coding, a coupling between the mobile radio device and the respective tyre pressure sensor can occur simply and fast and therewith the method, according to the invention, can be started faster and safer and also easier.

Besides, a computer programme product is subject matter of the present invention for the performance on a mobile radio device and saved on a machine-readable medium, comprising:
    machine-readable programme means, which initiate a processing unit to generate a data communication connection between the mobile radio device and the tyre pressure sensor,
    machine-readable programme means, which initiate a processing unit to select at least one sensor parameter specific for the vehicle via the mobile radio device,
    machine-readable programme means, which initiate the processing unit to activate the at least one selected sensor parameter in the tyre pressure sensor.

Preferably, machine-readable programme means are intended for the configuration of the steps of a method according to the invention. Therewith, a computer programme product, according to the invention, comprises the same advantages as already described for the method, according to the invention.

Besides, it is the subject of the present system from a mobile radio device and at least one tyre pressure sensor is subject matter of the present invention, which is coupled in a data communication connection or has a connection with the data communication connection and is configured for the performance of a method according to the invention.

Besides, a method adjusting a tyre pressure control unit to a vehicle type is subject matter of the present invention which is configured for the arrangement at a tyre of a vehicle with air tyres.

Such a tyre pressure control unit can be arranged at the inside of the air tyre, at the air tyre itself, the wheel rim or the valve. Further, the air tyre can arrange the tyre pressure control unit at the valve. The tyre pressure control unit, often called tyre electronic, comprises an institution for determining the air pressure within the air tyre so-called tyre pressure and/or for determining an alteration of the tyre pressure. The tyre pressure control unit can further comprise one or multiple institutions for a measuring of other state variabilities than the tyre pressure, particularly, a temperature sensor for measuring the temperature of the tyre pressure control unit and/or one or two acceleration sensors with which the movement state of the tyre can be determined. An electric gear, which normally comprises an ASIC, a microprocessor or a microcontroller, serves for the control of the tyre pressure control unit and for processing of the collected results. A programme for the gear is saved in a digital memory which is assigned to the gear or is part of the gear. Within the sense of the present invention, the device described as tyre pressure control unit, can be called tyre pressure sensor. In other words, a tyre pressure sensor can be configured as a tyre pressure control unit or at least part of a tyre pressure control unit.

The tyre pressure control unit is configured with a transmitter which operates in a "first" frequency range. Known tyre pressure control units comprise a transmitter which operates in the 315 MHz area or in the 433 MHz area. This transmitter transmits data from the tyre pressure control unit to a receiver assembled outside the tyre pressure control unit. A further receiver is intended at the tyre pressure control unit itself; it is configured to receive data from a second transmitter assembled outside the tyre pressure control unit which operates in a "second" frequency range which is different to the first frequency range. It is known to use such a second transmitter in order to trigger the tyre pressure control unit that it performs a measuring process and/or a transmitting process.

The tyre pressure control unit further comprises a power source for its power supply. The power source can be a long-lasting battery. The power source can likewise be, for example, a piezoelectric generator which reacts to deformation, vibration or acceleration of the air tyre which generates an electric voltage via the piezo effect and charges an electric condensator [capacitor] from which repetitively the power for at least one measuring and transmitting process can be extracted. Such a piezoelectric generator is, for example, known from DE 603 10 204 T2.

It is further known that vehicle manufacturers determine how a tyre pressure control unit has to operate for a certain vehicle type. Accordingly, the tyre pressure control unit for a selected vehicle type is adjusted to this vehicle type in order to fulfil the specification of the vehicle manufacturer. The specification varies from vehicle manufacturer to vehicle manufacturer and within the vehicle types offered by a vehicle manufacturer, and partly also from type to type. For different vehicle types therefore, multiple different tyre pressure control units are available and have to be available on the aftermarket and have to be in stock of dealers and workshops.

On the aftermarket are already tyre pressure control units known for all purposes and which are independently programmable. They have to be programmed in a vehicle workshop, in a tyre workshop or from a dealer with the specific software for the respective vehicle type. This is time-consuming since the software has to be downloaded via the internet or from a service CD and with this software the tyre pressure control unit has to be completely reprogrammed. The necessary transmission of programme codes and data which account for the software into the memory of the tyre pressure control unit normally occurs wireless via an LF channel with a frequency of 125 kHz (LF means low frequency). For this purpose known "universal" tyre pressure control units as described in U.S. Pat. No. 7,518,497 B2, comprise a receiver for 125 kHz signals.

The vehicle workshop or tyre workshop which wants to install a universal tyre pressure control unit in a vehicle requires internet access or computer with a programming station in order to transfer the whole software in the tyre pressure control unit. The extent of the to be transmitted programme codes and data is typically some 10 kilobytes. The programming is time-consuming and susceptible.

This subject matter of the present invention is based on the object to facilitate and cheapen the use of the tyre pressure control unit.

This object is solved by a method according to the subsequent description.

According to the invention, a said tyre pressure control unit is adjusted to a certain vehicle type in that in the memory of the tyre pressure control unit, initially a basic version of the programme is saved from which multiple different full versions of the programme can be developed and the tyre pressure control unit is equipped, which for different vehicle types different technical requirements have to be fulfilled which are, for example, given by the vehicle manufacturer. With this basic version of the programme, tyre pressure control units can be placed on the market only afterwards, when it is determined for which vehicle type such a tyre pressure control unit has to be used; for the selected vehicle type certain programme parameters are saved in the memory of the tyre pressure control unit and alter the originally saved basic version of the programme into a full version of the programme adapted to the selected vehicle type.

This has essential advantages:

The adjustment of the basic version of the programme to the selected vehicle type for which the tyre pressure control unit should be used and can be performed easier and faster than a previously necessary complete programming of the tyre pressure control unit with a specific software for the selected vehicle type.

For the adjustment of the basic version of the programme to the selected vehicle type, the manufacturers do not have to keep complex devices on the aftermarket and in the workshop, which should perform the adjustment. A hand-sized device with which digital command signals can be transmitted to the tyre pressure control unit in a wireless or wire-dependent manner is sufficient. Since only some programme parameters have to be transmitted, the command signal is short. Its length is typically between 10 and 30 bytes.

Adoption of the basic version of the programme through loading of the programme parameters which are specific for the selected vehicle type can be quickly undertaken.

The adjustment of the basic version of the programme by loading of programme parameters which are specific for the selected vehicle type can be performed quickly. The adjustment of the basic version of the programme by loading of programming parameters which are specific for the selected vehicle type is not susceptible to errors or malfunctions.

The greatest market for tyre pressure control units is in the U.S. since in the U.S. tyre pressure control system is required for new vehicles. The method, according to the invention, has the advantage that with its help a tyre pressure control unit can be used with the basic version of the programme altered, according to the invention, as a compensation of about 80% of the U.S. market available tyre pressure control units specific for the respective vehicle type.

The command signal with which the programming parameters are uploaded or the adjustment of the basic version can be transmitted with commercial devices as for example the TECH400SD, which are already on the market for the analysis of tyre pressure control systems and which can transmit digital command signals with the frequency of 125 kHz.

The basic version of the programme needs less memory capacity than the described memory of U.S. Pat. No. 7,518,495 B2 of multiple complete versions of programmes for the vehicle types in question.

Programming parameters are about specific values on which variables of a programme or a sub-programme can be adjusted. Therewith, a programme can be adjusted or flexibilized or the architecture of a programme or software can be modified.

The programme parameters can be transmitted wire-related in the memory of the tyre pressure control unit. This is also possible with tyre pressure control units whose switch is shed with a cast resin; for example, the cast resin can be broken through with electric contact needles which affect contacts on, in, or under cast resin. For facilitation, these positions of the surface of the cast resin which should be broken through, can be marked.

Preferably, the programme parameters are transmitted wireless to a provided receiver in the tyre pressure control unit. The transmission occurs particularly via radio signals in a "second" frequency range to the second receiver in the tyre pressure control unit. Therefore, a hand-sized device with a transmitter is sufficient which is about the "second" transmitter within the sense of claim 3, which operates in the "second" frequency range. This second sensor transmits the command signals to the second receiver provided in the selected tyre pressure control unit which interacts with the provided memory and the provided gear from which at least a part processes digitally. Such devices which can wirelessly transmit digital command signals to the tyre pressure control unit are known for persons skilled in the art. An example is the "TPMS Diagnostic and Programming Tool TECH400SD" of the company Bartec USA LLC in 44213 Phoenix Drive, Sterling Heights, Mich. 48314, USA.

The second transmitter which should transmit the command signals with the programme parameters thereby expediently operates with a lower frequency than the first transmitter, particularly in a frequency range of 50 kHz to 300 kHz, preferably within 125 kHz, since the range of this LF-signals is shorter than the range of the signals which are transmitted to a receiver provided in the vehicle at the outer side, with a frequency of 315 MHz to 433 MHz.

The limited range is no disadvantage since the hand-sized device for the transmission of the programme parameters can easily approach the tyre pressure control unit for the transmission of the programme parameters. The smaller range has the advantage that the programme parameters are only effectively received and saved only by the nearest tyre pressure control unit.

Since with the production of a patent-like tyre pressure control unit, it is not known which vehicle types are about to be used in, in the basic version of the programme the programme parameters are preferably only saved with preliminary values. The preliminary saved values can principally be selected randomly. They do not have to enable a monitoring of the tyre pressure for a specific vehicle type. Preferably, however, such values of the programme parameter are preliminary saved in the tyre pressure control unit ex factory which enable a monitoring of the tyre pressure for at least one of multiple potential vehicle types. Preferably, one selects an often-used vehicle type. In case there are multiple vehicle types by which the tyre pressure control unit can operate with the same programme parameters, these programme parameters can be saved ex factory as preliminary programme parameters.

At aftermarket distributors or in a vehicle workshop or in a tyre workshop the preliminary saved programme data in the basic version of the programme are amended in order to adjust the tyre pressure control unit to a certain vehicle type. Thereby, the preliminary saved programme parameters are overwritten with the preliminary transmitted programme parameter determined for the selected vehicle type. In this connection, the programme parameters saved in the basic version of the programme can initially be copied to other memories before the subsequently transmitted programme parameters determined for the selected vehicle type, are saved. The backup of the originally saved programme parameters enables to reset the tyre pressure control unit in its original state as required.

As programme parameters which can vary from vehicle type to vehicle type and therefore are saved in a basic version of the programme in the tyre pressure control unit, according to the invention, and can be subsequently amended, particularly the following parameter are possible:

Alert threshold for an insufficient power supply. A sufficient power supply for a proper function of the tyre pressure control unit is essential. Therefore, it is important that in case the voltage and/or the charging state of a battery, provided for the tyre pressure control unit falls below a predetermined threshold or in case the charge level of a condensator [capacitor], which should be charged during driving by a piezoelectric generator repeatedly falls below a threshold or in case transmission processes cannot be performed or not at the given point of time or incompletely due to an insufficient power supply, a report to the driver is important in this case to remedy the action and not trust that the tyre pressure control unit works correctly.

Programme parameters which determine the installation of a data telegram from the tyre pressure control unit. Depending on the vehicle manufacturer, such data telegram contains different contents, for example selected from a group of pressure, pressure difference, temperature, state of charge of the battery, movement state of the wheel, an identification, which individualises the tyre pressure control unit, the form of a preamble, which initiates the data telegram and the chronological order, in which the data to be transmitted are contained in the telegram. Thus, a vehicle manufacturer could prescribe that, for example, at a first position subsequent to the preamble, a pressure signal, at the second position a pressure difference signal and at the third position a temperature value, at the fourth position the identification, at the fifth position the state of charge of the battery and at the sixth position an information occurs, if the wheel rests or turns. This can be determined by the programme parameters, which are specific for the corresponding vehicle type.

Programme parameters which determine a transmission speed of the "first" transmitter, which is the transmitter which in the tyre pressure control unit since the transmission speed, which is generally indicated in baud which has to match between transmitter and receiver and the receiver is predetermined in the vehicle, the transmission speed of the transmitter in the tyre pressure control unit has to be adjusted to the transmission speed for which the external receiver is designed. The adjustment can be determined by a corresponding programme parameter.

Programme parameters which determine the modulation art of the sensor in the tyre pressure control unit. Besides, the modulation art of the transmitter, frequency modulation or amplitude modulation must be aligned to the available receiver in the vehicle which is designed for a certain modulation art and can be determined by a programme parameter.

Programme parameters, which determine time intervals between measuring processes and time intervals between sending processes. Such time intervals are normally predetermined by the vehicle manufacturer and have potentially to be adjusted to the functionality of the receiver device within the vehicle. The time intervals can be fixed or they can be dependent on the measured pressure, pressure loss, or dependent from the speed of the vehicle. Thus, it is known that the frequency of pressure measuring processes and sending processes increases with an increasing speed of the vehicle wherein the sending processes do not necessarily occur as often as the pressure measuring processes. Further, it is known, with exceeding of the predetermined tyre pressure-drop speed, to increase the pressure measuring rate and the transmitter rate in order to achieve clarity, if actually a crucial pressure loss or an incorrect measurement is available. In accordance with that, it can be indented with an exceeding of a predetermined pressure increasing speed. Under which circumstance or when this should happen, can be determined in the programme by a programme parameter.

A programme parameter which determines the type of coding of the data telegram to be sent by the tyre pressure control unit. The tyre pressure control unit normally uses a Manchester coding. There are different types available, from which the appropriate type can be determined by transmission of a corresponding programme parameter.

Programme parameters which determine which state the tyre pressure control unit is allowed to take over, which transfer between the states is allowed and under which conditions they occur. Such states can, for example, be:

A resting state in which the vehicle rests longer than a predefined time range. This time range can be determined by a programme parameter. It can also be determined, if pressure measurements occur in the resting state and if so, in which time intervals and if sending processes should take place and if so, of which time intervals.

Another state is the normal state with a moving vehicle. For this state can, for example, be determined starting from which rotational speed of the wheel, which can be measured by an acceleration sensor in the tyre pressure control unit, the transition form the resting state to a normal movement state occurs. In this, it can be determined in which time intervals normally pressure and temperature are measured, for example, in intervals of 3 seconds and in which intervals sending processes should occur, for example, intervals of 60 seconds.

A third state can be the fast sending mode. In this, the tyre pressure control unit is transferred, in case the tyre pressure falls below a low threshold and when the pressure loss speed exceeds an upper threshold. For the fast sending mode, it can be determined by a programme parameter how often measuring processes and sending processes occur in this mode, for example, in intervals of 1 second.

A programme parameter, which determines the frequency on which the transmitter in the tyre pressure control unit should send. The tyre pressure control unit can, for example, be established to send optionally in a frequency range of 433 MHz, which is standard in Germany, or in a frequency range 315 MHz, which is standard in the U.S. The selection can be made by an input of a corresponding programme parameter.

Tyre pressure control units regularly have an individual identification, which they are transmitting as part of the data telegram to the receiver in the vehicle in order to determine from which wheel of the vehicle the transmitted data telegram results. In an advantageous embodiment of the invention, an identification, which is already saved in the basic version of the programme of a tyre pressure control unit, can subsequently be amended. This enables to request the identification of the previous tyre pressure control unit and to transmit this identification into a new tyre pressure control unit which should exchange at the same wheel position the tyre pressure control unit in cases in which at a certain wheel position of a vehicle, a tyre pressure control unit is exchanged by another tyre pressure unit in case the previous tyre pressure control unit is defect or in case, for example, a summer tyre is exchanged by a winter tyre. This bears the advantage that a central device in the vehicle does not have to learn a new identification in case of such an exchange, but after the exchange, the tyre pressure control unit is fully functional. The request and the display of the identification of the to be exchanged tyre pressure control unit can, for example, occur with the device TECH400SD.

For the transmission of the programme parameters which are determined for a certain vehicle type, preferably a wireless working transmission device is used which transmits digital command signals and works in LF-codes which are able to interpret the digital switch in the tyre pressure control unit. A suitable transmission device is, for example, the already mentioned TECH400SD. On this transmission device a menu, preferably a pulldown menu which contains the necessary programme parameters for the amount of vehicle types, can be installed for the possible vehicle types such that by entering of the type description, the corresponding programme parameters are requestable. The menu can be pre-installed by the manufacturer of the transmission device or can be downloaded from the internet to the transmission device or from a CD-ROM or another data carrier or medium read into the transmission device which can be supplied by the manufacturer of the transmission device or the manufacturer of the tyre pressure control unit according to the invention. The device TECH400SD, for example, contains a slot, in which a memory card (SD card) can be plugged in in order to enable software updates. In this manner, such a pulldown menu can be loaded. In order to perform the transmission of the necessary programme parameter, only that suitable has to be applied which can be designated by the type of the vehicle and the transmission into the memory of the tyre pressure control unit, can be started. The transmission is completed in seconds. Afterwards, the transmitted programme parameters can be saved against further alterations, but particularly by a randomly triggered command signal.

Instead of a transmitting device like the TECH400SD, a programme parameter can be transmitted by a cell phone, particularly a smartphone, in case these are configured with an interface via which data can be transmitted to the second frequency range via radio signals.

A system from such a transmitting device with a menu for selecting a set of programme parameters which belong to a selected vehicle type and with one or multiple tyre pressure control units as described in which a selected set of programme parameters has to be transmitted, is possible in the scope of the present invention.

The programme parameter can be transmitted wire-dependent into the memory of the tyre pressure control unit. With tyre pressure control units of which switching is shed with a cast resin, for this purpose the cast resin can be broken through at particularly marked positions of its surface using electronic contact needles, to which contacts port, which are underneath the marked positions.

It is more preferable to wirelessly send the programme parameters to a second receiver in the respective tyre pressure control unit which is configured in a way to receive data from a transmitter outside the tyre pressure control unit which works in a second frequency range. In this case, the transmitting device comprises the second transmitter sending in the second frequency range.

The transmitting device does not have to be necessarily a specific device like the TECH400SD. It is an advantage of the present invention that the transmitting device can be a cell phone, particularly a smartphone. Cell phones which comprise an interface for the output of data are already known. In a system according to the invention therefore, a cell phone is used with this advantage which comprises an interface for the output of data to which the transmitted programme data belong. For the purpose of a wireless transmission, an assembly unit is provided, which can be configured as a separate module and connected to the interface of the cell phone. Preferably, the module can be rigidly connected with the cell phone, for example pluggable, such that the mobile phone and module can be used as a unit. This component unit comprises a transmitter working in the second frequency range and a control unit, which receives programme parameters sent via the interface and therewith controls the transmitter of the component unit that the transmitter transmits the programme parameter to the second receiver in the tyre pressure control unit. The transmitter provided in the component unit is adjusted with its transmitter frequency to the frequency range in which the second receiver, provided in the tyre pressure control unit, can receive particularly at 125 kHz.

Generally, a transmitter is in the tyre pressure control unit together with the unit for measuring the tyre pressure in an integrated circuit, for example in an application-specific integrated circuit (ASIC), in a microcontroller or in a microprocessor. The integrated circuit can contain further sensors, for example an acceleration sensor and/or temperature sensor. Further, it can take over tasks for the evaluation or pre-evaluation of the collected data and for the control of the tyre pressure control unit.

In the known tyre pressure control units, the memory is not big enough in order to receive basic software for all tyre pressure control systems available on the market. In an advantageous embodiment of the invention, it is therefore intended to provide an additional memory in the tyre pressure control unit outside the integrated circuit, particularly EPROM. Between the integrated circuit with its memory on the one side and the additional memory on the other side, a wire connection shall be established via which a communication between the integrated circuit and its memory on the one side and the additional memory on the other side is enabled. The basic software can thus be saved partly in the memory of the integrated circuit and partly in the additional memory. The additional circuit can be so dimensioned that it can receive basic software which satisfies a greater amount of tyre pressure control systems, as it would be possible with the available memory in the integrated circuit. The additional memory is preferably measured in that it can receive basic software which is sufficient for all, or almost all, tyre pressure control systems available on the market.

The communication between the memory provided in the integrated circuit and the additional memory occurs preferably encrypted. Therewith, it can be avoided that data are absorbed and unknown business software of the tyre pressure control unit can be analysed via a wire connection between the integrated circuit and the additional memory.

A further subject matter of the invention is a method for adjusting a tyre pressure control unit to a vehicle type wherein the tyre pressure control unit is configured for the assembly at a wheel of a pneumatic tyre and a unit for measuring of the air pressure (tyre pressure) within the pneumatic tyre or an alteration of the tyre pressure, further units for measuring of other measured parameter than the tyre pressure, an electric switch for which at least a part works digitally for the controlling of the tyre pressure control unit, and if necessary, for the processing of the measure values generated by the measure unit, a memory in which a programme is saved for the switch, an electric power source for the power supply of the tyre pressure control unit and a first transmitter operating in a first frequency range for transmitting data from a tyre pressure control unit to a first receiver outside the tyre pressure control unit, characterised in that in the memory, initially a basic version of the programme is saved from which multiple different versions of the programme developed for multiple vehicle types and that for a selected vehicle type, a matching full version is generated by the fact that for a selected vehicle type, certain programme parameters are subsequently saved in the memory of the tyre pressure control unit.

A method, according to the invention, can be improved in that the tyre pressure control unit has an entrance via which the programme parameter is transmitted to memory in a wire.

A method, according to the invention, can be further improved in that a second receiver is intended in the tyre pressure control unit which is configured to receive data from a second transmitter outside the tyre pressure control unit operating in a second frequency range, and that the programme parameters are transmitted into the second receiver via radio signals and a second frequency range.

A method, according to the invention, can be further improved by the use of a second transmitter which operates in a lower frequency than the first transmitter.

A method, according to the invention, can be further improved by the use of a second transmitter which operates with a frequency in the range of 50 to 300 kHz, preferably with 125 kHz.

A method, according to the invention, can be further improved that the programme parameters are transmitted with a cell phone, particularly a smartphone, to the memory of the tyre pressure control unit which is configured with an interface via which radio signals are sent to the second frequency range.

A method, according to the invention, can be further improved by the use of a basic version of the programme in which programme parameters are saved with preliminary values.

A method, according to the invention, can be further improved in that the preliminary saved values of the programme parameters are selected in such a way that they enable a monitoring of the tyre pressure for at least one vehicle type.

The method, according to the invention, can be further improved in that the preliminary saved programme parameters in the basic version of the programme saved in the memory are overwritten with certain programme parameters subsequently transmitted for the selected vehicle type.

The method, according to the invention, can be further improved in that the programme parameters saved in the basic version of the programme are copied to other memory positions and are saved by that before the subsequently transmitted programme parameters determined for the selected vehicle type are saved.

A method, according to the invention, can be further improved in that one or more multiple programme parameters are saved from the following groups of programme parameters in the memory of the tyre pressure control unit:
  Alert threshold for insufficient power supply;
  programme parameters which determine the assembling of a data telegram sent to a tyre pressure control unit;
  programme parameters which determine a transmission speed of the first transmitter;
  programme parameters which determine the modulation manner of the first transmitter;
  programme parameters which determine time intervals between measuring processes and time intervals between sending processes pressure dependent and/or speed dependent;
  programme parameters which determine the type of coding of a data telegram to be sent by the tyre pressure control unit;
  programme parameters which determine which state the tyre pressure control unit can adopt which transitions between these states are enabled and under which conditions they occur;
  a programme parameter which determines the frequency the first transmitter is sending with.

A method, according to the invention, can be further improved in that programme parameters are saved which determine time intervals between the measuring processes and/or between the sending processes, depending from the tyre pressure and/or depending from the tyre pressure decreasing speed and/or depending from the vehicle speed.

A method, according to the invention, can be further improved in that as programme parameters, an identification in the memory of a first tyre pressure control unit is saved in the basic version of the programme which individualises the first tyre pressure control unit and that the identification can be subsequently overwritten with an identification of a tyre pressure control unit which is replaced by a steady wheel position of the vehicle by a first tyre pressure control unit.

The method, according to the invention, can be further improved in that the transmitted programme parameters are saved against an amendment.

A further embodiment of the present invention is a system from one or multiple tyre pressure control units, which are configured for the adjustment or assembly of a vehicle with pneumatic tyres and a unit for measuring the air pressure (tyre pressure) of the pneumatic tyre or an alteration of the tyre pressure, possibly one or multiple units for measuring other values than the tyre pressure, an electric or electronic switch from which at least a part operates digitally for controlling of the tyre. Tyre pressure control unit and possibly values generated for the operation of the measuring unit, a memory in which a programme for the switch is saved, an electric power source for the power supply of the tyre pressure control unit, a first sensor operating in a first frequency range for transmitting data from the tyre pressure control unit to a first receiver outside the tyre pressure control unit and from a digital transmission device in which multiple addresses correspond to selected vehicle types, a set of programme parameters is saved respectively which is determined to be transmitted to the memory of the tyre pressure control unit specific for the selected vehicle type after the selection of such a set in order to transfer a saved basic programme, already saved in the tyre pressure control unit to a full version of the programme suitable for the selected vehicle type by insertion of the selected programme parameters with which the tyre pressure control unit can control the tyre pressure of a wheel at the selected vehicle type.

A system, according to the invention, can be further improved in that in the system the set of programme parameters in the transmission device are available in a pulldown menu.

A system, according to the invention, can be further improved in that a second receiver which is configured to receive data from a second transmitter working in a second frequency range assembled outside the tyre pressure control unit intended in the tyre pressure control unit, that a transmission device comprises the second transmitter sending in the second frequency range.

A system, according to the invention, can be further improved in that the transmission device is a cell phone, particularly a smartphone.

A system, according to the invention, can be further improved in that the cell phone comprises an interface for the output of data to which the transmitted programme parameters belong and that this interface is connectable to the assembly unit which is part of the system and comprises the transmitter operating in the second frequency range and a control switch which receives programme parameters via the interface and controls the transmitter in that the programme parameters are transmitted to the second receiver.

A system, according to the invention, can be further improved in that a first memory of the tyre pressure control unit is integrated together with the unit for measuring the tyre pressure in an integrated circuit that in the tyre pressure control unit. Further, an additional memory is indented wherein the first memory and the additional memory together configure the memory of the tyre pressure control unit that between the first memory and in the integrated circuit and the additional memory a wire connection exists via which a communication between the first memory and the additional memory is enabled, and that the basic version of the programme is saved partly in the first memory of the integrated circuit and partly in the additional memory.

A system, according to the invention, can be further improved in that the additional memory is an EPROM.

A method, according to the invention, can be further improved in that it is performed in a system according to the previous paragraphs wherein the communication between the first transmitter and the integrated circuit and the additional memory occurs encrypted.

Further advantages, features and details of the invention, result from the subsequent description in which embodiments of the invention and described in detail with relation to the drawings. Thereby, the claims and the features described in the claims and in the description can be essential for the invention each single for themselves or in any combination. It is shown schematically:

Figure 1:
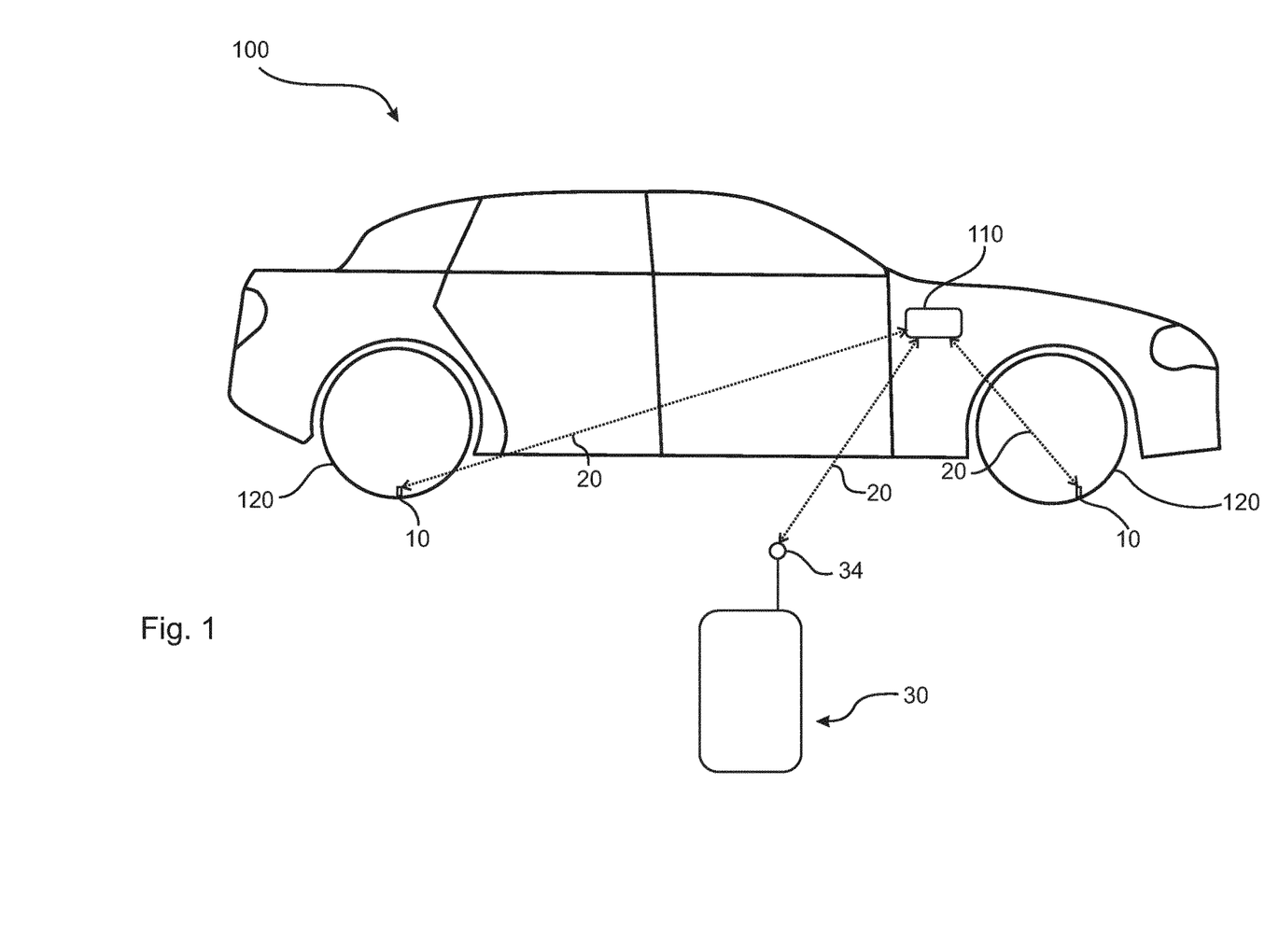
FIG. 1 an embodiment of a method, according to the invention, at a vehicle.

In FIG. 1, a vehicle 100 is schematically shown with in total four wheels 120, wherein two wheels 120 can be recognised from the right side. The vehicle 100 is configured with a control device 110 which is configured for data communication via a data communication connection 20 with a tyre pressure sensor 10 of the wheels 120. In order to perform the method, according to the invention, a data communication connection 20 to the control device 110 is established with the help of a mobile radio device 30, here with the help of a cell phone via a corresponding radio interface 34. Therewith, an indirect data communication connection 20 exists between the mobile radio device 30 and one particularly at the same time all tyre pressure sensors 10. Subsequently, the method is performed in a way that for this vehicle 100, a specific sensor parameter or a corresponding specific sensor parameter group is selected and is activated for these tyre pressure sensors. The activation occurs particularly via a transmission from a memory of the mobile radio device 30 via the data communication connection 20 in the tyre pressure sensors 10. Alternatively, an activation in form of setting a tag is possible within a memory device of the tyre pressure sensors 10.

Figure 2:
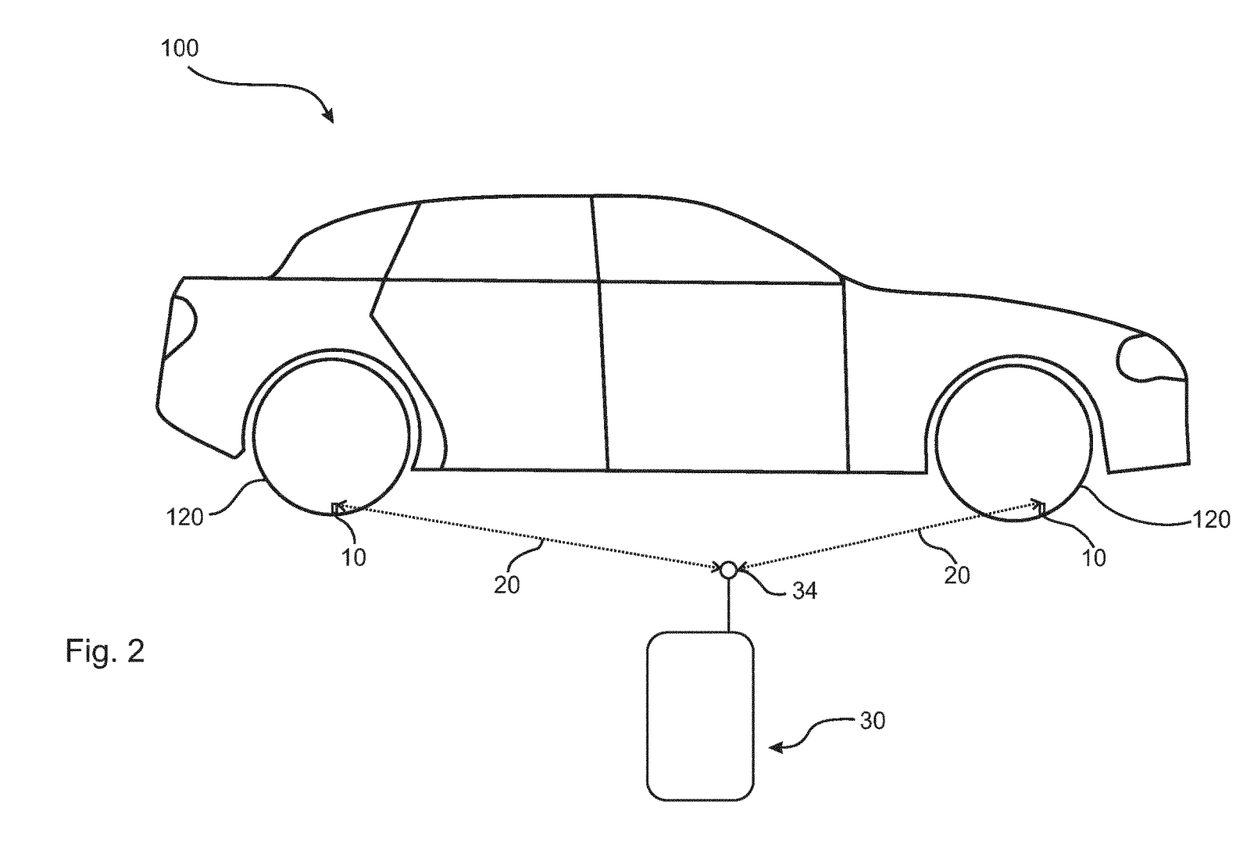
FIG. 2 an embodiment of a method, according to the invention, at a vehicle.

FIG. 2 shows another embodiment of the method of FIG. 1. A control device 110 is not necessary within the vehicle 100. Rather, in a direct communication the respective data communication connection 20 can be established preferably in a parallel manner between the mobile radio device 30 and one or all tyre pressure sensors 10. The further method steps proceed as already described related to FIG. 1.

Figure 3:
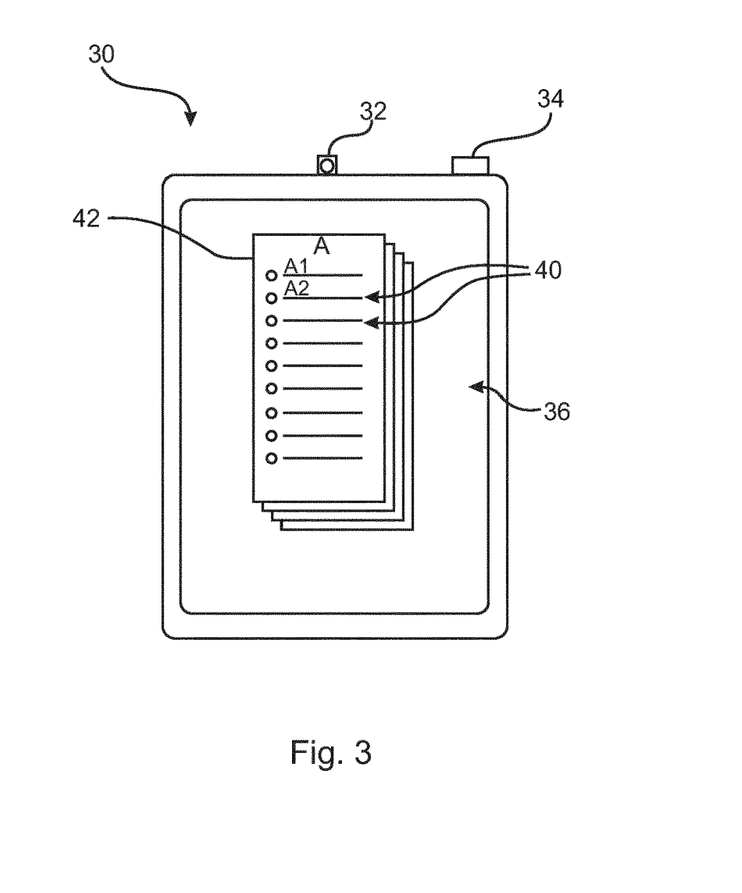
FIG. 3 a possibility of a selection step.

In FIG. 3, a possibility is shown how a mobile radio device 30, here in form of a table PC or a cell phone, a selection step can be performed. Thus, on a display 36 as a display device of the mobile radio device 30, particularly with touch functionality, a database 42 with a plurality of possible sensor parameters is shown. For the first sensor parameter, here two different values A1 and A2 for the sensor parameter A are indicated. These can be selected and subsequently assigned via a data communication connection 20 to the respective tyre pressure sensor 10. Besides the radio interface 34, the embodiment of the mobile radio device 30 comprises additionally a scan device 32 in form of a camera. The scan device 32 is able to recognise a coding 11, as for example shown in FIG. 6. Therewith the coupling for the data communication device 20 is enabled in a simple and fast manner.

Figure 4:
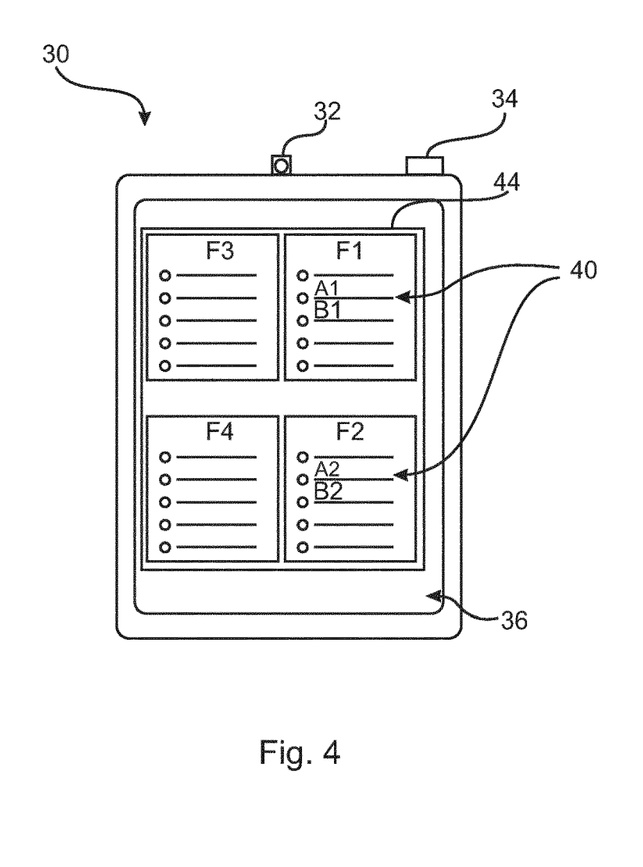
FIG. 4 a further possibility of a selection step.

FIG. 4 schematically shows an alternative embodiment of a selection step. Here, a vehicle database 44 is shown on the display 36 of the mobile radio device 30 for a plurality of different vehicle types F1 to F4. A group of single sensor parameters with corresponding direct values A1, B1, A2 and B2 is shown for the sensor parameters respectively. The user only has to select the group of sensor parameters for the selection step by use of the information of the respective vehicle type F1 to F4 in order to perform the selection step of the configuration fast and securely.

Figure 5:
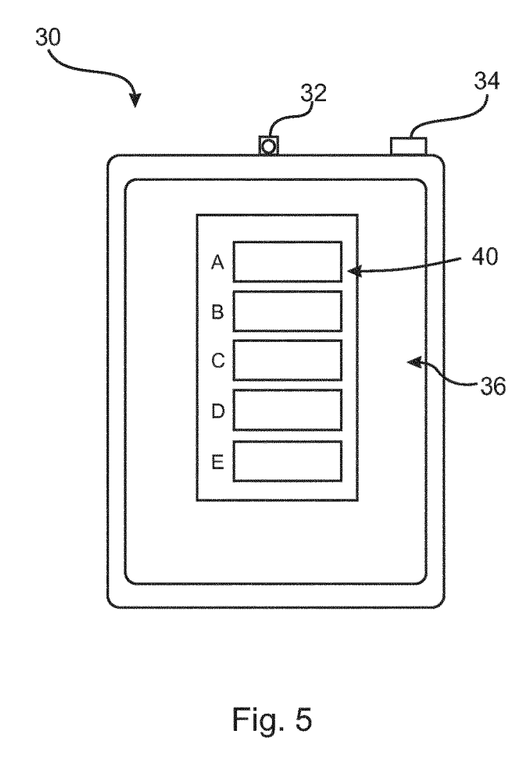
FIG. 5 a further possibility of a selection step.

FIG. 5 shows a possibility of a mainly free configuration of the sensor parameter A to E which is here equipped with an input field for the free input of values. These three possibilities of FIGS. 3 to 5 can naturally also be provided separately or can be combined with one another.

Figure 6:
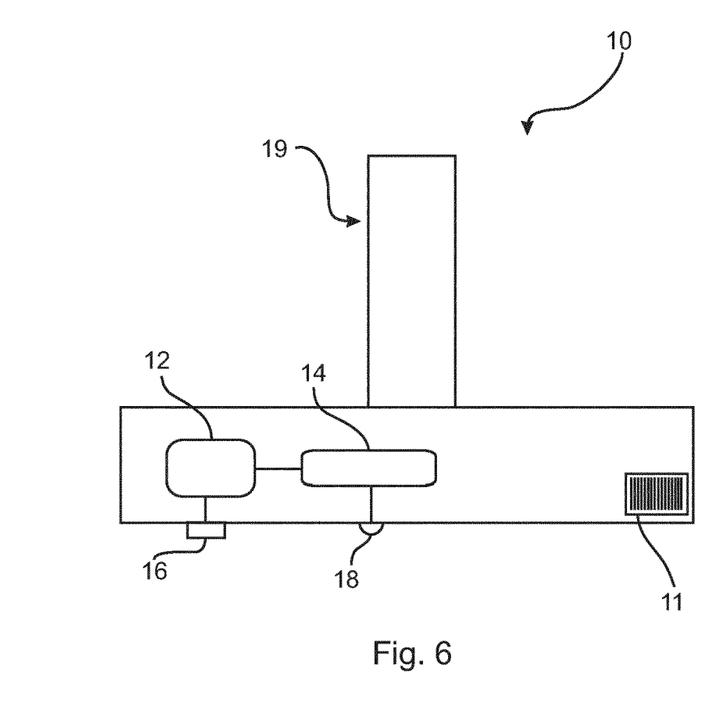
FIG. 6 a possible embodiment of a tyre pressure sensor for a method according to the invention and FIG. 7 a block diagram of the system according to the invention.

A method, according to the invention, is particularly performed for a tyre pressure sensor 10, as for example shown in FIG. 6. Here, already a combination with a valve 19 is performed. The tyre pressure sensor 10 thereby comprises the sensor element 18 for the recognition of the tyre pressure. Further, a processing unit 14 is intended which is in a data communication connection with a memory unit 12. Using a radio interface 16, the data communication connection 20 can be generated in the memory unit 12, already pre-selected or pre-selectable sensor parameters can be saved. Further, it is possible that for the activation of the specific sensor parameter after transmission via a data communication connection 20, the storage in this memory unit 12, this activation is shown or at least partially shown.

The previous description of the embodiment shows the present invention only within the scope of examples. Naturally, single features of the embodiments as far as technically meaningful can be freely combined with one another without leaving the scope of the present invention.

Figure 7:
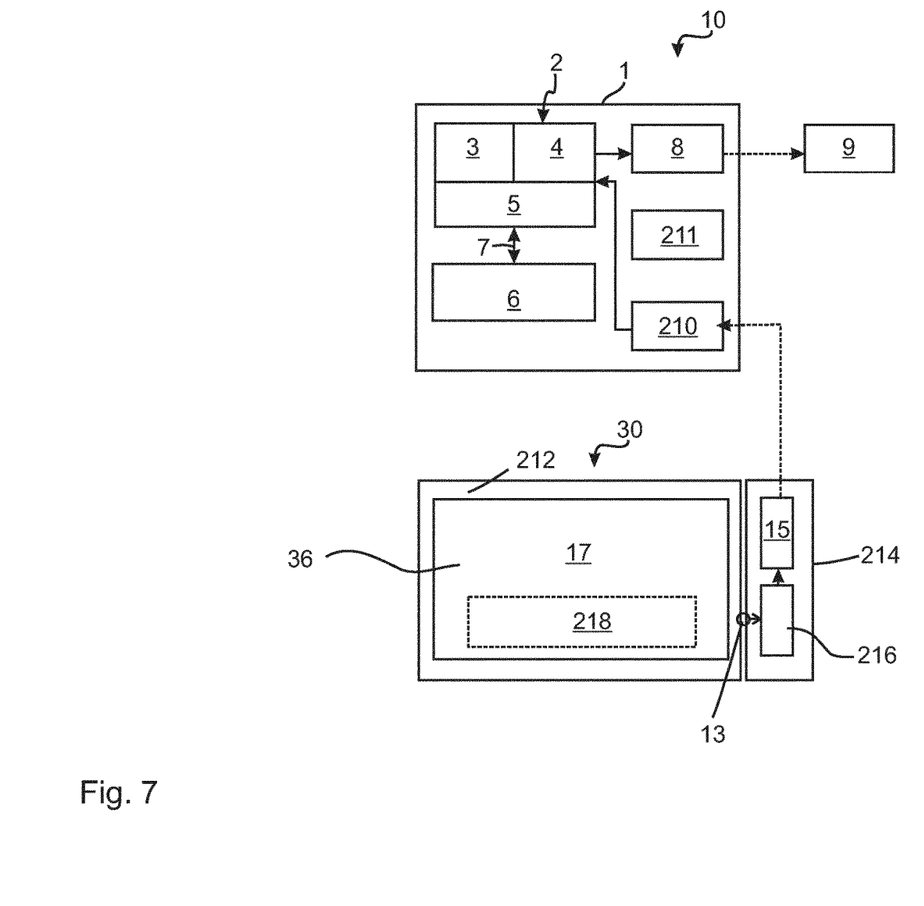

The system, according to FIG. 7, comprises at least one tyre pressure control unit 1 with an integrated circuit 2, in which among others, a pressure sensor 3 for measuring the tyre pressure, a control evaluation switch 4 and a first memory 5 are configured. Besides, the integrated circuit 2, an additional memory 6 occurs in the tyre pressure control unit 1, for example, an EPROM. The additional memory 6 comprises a wire connection 7 with the integrated circuit 2. The data traffic between the integrated circuit 2 and the additional memory 6 occurs encrypted.

The integrated circuit 2 controls a first transmitter 8 which, for example, sends with the frequency of 433 MHz for the tyre pressure control system. The transmitter transmits data, particularly the tyre pressure and deducted sizes, an identification and possibly further data provided by an integrated circuit 2 via radio to a receiver 9 intended outside the tyre pressure control unit 1 which is assembled at a suitable position in the vehicle or at the lower side of the vehicle at which a wheel is mounted which is configured with the tyre pressure control unit 1. A second receiver 210 is intended in the tyre pressure control unit 1; it receives at a frequency which is different to the frequency, which with the first transmitter 8 sends, particularly lower as the frequency of the first transmitter 8. It is preferred when the second receiver is coordinated on a frequency of 125 kHz. A battery 211 provides the necessary energy for parts of the tyre pressure control unit 1 for their operation.

In the memories 5 and 6 of the tyre pressure control unit 1, a basic software is integrated ex factory which is completed or altered by overwriting of predefined programme parameters by transmission of a few programme parameters of about 20 to 30 byte to a full version of the operation software for the tyre pressure control unit 1 for the selected vehicle type. In order to transmit these few programme parameters in the tyre pressure control unit 1; for example, a smartphone 212 is provided which comprises a wire-related interface 13 via which digital data can be expended. At this interface, a module 214 can be docked which comprises a second transmitter 15 whose sending frequency is adjusted to the frequency of the second receiver 210, provided in the tyre pressure control unit 1. Further, in the module 214, a control switch 216 is provided, for example a microcontroller, which receives data via the interface 13 which it transmits into the tyre pressure control unit 1 with the second transmitter 15. These data comprise programme parameters which can be selected with a software-related display 17 of the keyboard 218 displayed on the smartphone 212 and can be retrieved or put into a memory in order to supplement the basic software already saved in the tyre pressure control unit 1 for the full version of the operating software for the tyre pressure control unit 1 for the desired vehicle type.

The smartphone 212 can further be used in order to retrieve data from the tyre pressure control unit 1, for example, the present tyre pressure.

REFERENCE LIST 1 tyre pressure control unit
2 integrated circuit
3 pressure sensor
4 control evaluation switch
5 first memory
6 additional memory
7 wire connection
8 first transmitter
9 first receiver
210 second receiver
211 battery, power source
212 smartphone, cell phone
13 wire-related interface
214 module, assembly unit
15 second transmitter
216 control switch
17 display
218 keyboard
10 tyre pressure sensor
11 coding
12 memory unit
14 processing unit
16 radio interface
18 sensor element
19 valve
20 data communication connection
30 mobile radio device
32 scan device
34 radio interface
36 display
40 sensor parameter
42 database
44 vehicle database
100 vehicle
110 control device
120 wheel
A first sensor parameter
An vehicles for the first sensor parameter
B second sensor parameter
Bn values for the second sensor parameter
C-E additional sensor parameters
Fn vehicle type

The invention claimed is:

1. A method for configuration of a tyre pressure sensor for a vehicle, comprising:
producing a two-way data communication connection between a mobile phone and a tyre pressure sensor;
selecting at least one specific sensor parameter for the vehicle via the mobile phone; and
activating the at least one selected sensor parameter and the tyre pressure sensor,
wherein the data communication connection is established as a wireless connection.

2. The method according to claim 1, wherein the two-way data communication connection is established in a direct manner with the tyre pressure sensor.

3. The method according to claim 1, wherein the two-way data communication connection is established in an indirect manner via a control device of the vehicle.

4. The method according to claim 1, wherein the method steps of producing the two-way data communication connection, selecting the at least one sensor parameter, and activating the at least one selected sensor parameter occur after mounting of the tyre pressure sensor on a wheel rim.

5. The method according to claim 1, wherein the two-way data communication connection is established on a basis of at least one of the following radio standards: WLAN and Bluetooth.

6. The method according to claim 1, wherein a step of selecting the at least one specific sensor parameter further comprises the nonselection of at least one other sensor parameter of the tyre pressure sensor.

7. The method according to claim 1, wherein a step of selecting the at least one specific sensor parameter is from a plurality of sensor parameters, the plurality of sensor parameters comprising at least two of: a communication format for a control device of the vehicle, an area of the tyre pressure sensor, and a trigger limit of the tyre pressure sensor.

8. The method according to claim 1, wherein the mobile phone represents a device, which is not a programming device for the tire pressure sensor, and is a device which serves as a primary function for the mobile radio or a similar utilization.

9. The method according to claim 1, wherein the method further comprises sending a request for the at least one specific sensor parameter to the tyre pressure sensor from the mobile phone via the two-way data communication connection.

10. The method according to claim 1, wherein a step of selecting the at least one sensor parameter specific for the vehicle occurs from a memory unit of the tyre pressure sensor.

11. The method according to claim 10, wherein a step of selecting at least one sensor parameter specific for the vehicle occurs from predefined sensor parameters.

12. The method according to claim 1, wherein a step of selecting the at least one sensor parameter specific for the vehicle occurs from a database in which the respective sensor parameter is saved.

13. The method according to claim 12, wherein the respective sensor parameter is saved in correlation to the respective vehicle.

14. The method according to claim 1, wherein a step of selecting the at least one sensor parameter comprises selecting at least two sensor parameters specific for the vehicle, wherein said at least two sensor parameters are selected commonly via a selection of the vehicle.

15. The method according to claim 14, wherein the at least two sensor parameters specific for the vehicle are selected from a vehicle database.

16. The method according to claim 1, wherein the two-way data communication connection is provided between the mobile phone and at least two tyre pressure sensors of different wheels of the vehicle, and wherein the two-way data communication connection is generated for a common configuration of the at least two tyre pressure sensors.

17. The method according to claim 16, wherein the two-way data communication connection is generated for a common configuration with all tyre pressure sensors of all wheels of the vehicle.

18. The method according to claim 1, wherein the tyre pressure sensor is selected for this method by scanning of a coding.

19. The method according to claim 18, wherein the tyre pressure sensor is selected via a scan device of the mobile phone.

20. A computer programme product for configuration of a mobile phone and saved on a non-transitory machine readable medium, comprising:
   a machine readable programme, which arranges a processing unit to generate a two-way data communication connection between the mobile phone and a tyre pressure sensor,
   the machine readable programme arranges the processing unit to select at least one sensor parameter specific for a vehicle via the mobile phone, and
   the machine readable programme arranges the processing unit to activate at least one selected sensor parameter in the tyre pressure sensor.

21. The computer programme product according to claim 20, wherein the machine readable programme is configured for a method for the configuration of a tyre pressure sensor for a vehicle, comprising:
   producing the two-way data communication connection between the mobile phone and the tyre pressure sensor;
   selecting at least one specific sensor parameter for the vehicle via the mobile phone; and
   activating the at least one selected sensor parameter and the tyre pressure sensor,
   wherein the two-way data communication connection is established as a wireless connection.

* * * * *